US006247417B1

(12) United States Patent
Heimbuch

(10) Patent No.: US 6,247,417 B1
(45) Date of Patent: Jun. 19, 2001

(54) EQUIDISTANT PLANTING SYSTEM

(76) Inventor: Thomas A. Heimbuch, 9748 - 122nd Ave. SE., Cogswell, ND (US) 58017

( * ) Notice: Subject to any disclaimer, the term of this patent is extended or adjusted under 35 U.S.C. 154(b) by 0 days.

(21) Appl. No.: 09/580,619

(22) Filed: May 30, 2000

Related U.S. Application Data

(63) Continuation-in-part of application No. 09/361,708, filed on Jul. 27, 1999, now Pat. No. 6,173,664.
(51) Int. Cl.$^7$ ........................................................ A01C 7/18
(52) U.S. Cl. .............................. 111/178; 111/77; 221/211
(58) Field of Search ............................... 111/77, 78, 75, 111/177, 178, 179, 185, 171; 221/211, 263, 266, 264, 265, 277

(56) References Cited

U.S. PATENT DOCUMENTS

| | | | |
|---|---|---|---|
| 3,572,547 | * 3/1971 | Walberg | 221/220 |
| 3,622,042 | * 11/1971 | Fischer | 221/219 |
| 3,670,671 | * 6/1972 | Lienemann et al. | 111/77 |
| 4,162,744 | * 7/1979 | Barker et al. | 221/251 |
| 5,992,338 | * 11/1999 | Romans | 111/171 |

\* cited by examiner

Primary Examiner—Robert E. Pezzuto
(74) Attorney, Agent, or Firm—Michael S. Neustal

(57) ABSTRACT

An equidistant planting system for accurately placing seeds in a furrow thereby providing increased crop yields. The inventive device includes a rim member having a lower opening, a main disk rotatably positioned within the rim member, a plurality of feeder tubes attached to the main disk, a center disk secured to the main disk having a plurality of receiving channels that correspond with each of the feeder tubes, a plurality of first apertures extending through the center disk and the main disk adjacent each of the receiving channels, and a manifold having an end cutout rotatably positioned about the center disk. The manifold is fluidly connected to a seed tube and an air tube wherein the air tube provides pressurized air to the manifold which escapes through the first apertures creating a vertex within the distal portion of the receiving channels which retains the seeds in the proper position. As the center disk and main disk rotate within the rim member, one of the receiving channels and the corresponding feeder tube is aligned with the end cutout within the manifold forcing the retained seed through the feeder tube to the distal portion of the feeder tube. As the distal end of the feeder tube passes over the lower opening within the rim member, the seed is released at approximately zero velocity with respect to the ground surface thereby reducing seed movement after placement.

20 Claims, 5 Drawing Sheets

EQUIDISTANT PLANTING SYSTEM

CROSS-REFERENCE TO RELATED U.S. PATENT APPLICATION

I hereby claim benefit under Title 35, United States Code, Section 120 of U.S. application Ser. No. 09/361,708 filed Jul. 27, 1999. This application is a continuation-in-part of U.S. Ser. No. 09/361,708, filed Jul. 27, 1999, now U.S. Pat. No. 6,173,664.

BACKGROUND OF THE INVENTION

1. Field of the Invention

The present invention relates generally to planter devices and more specifically it relates to an equidistant planting system for accurately placing seeds in a furrow thereby providing increased crop yields.

Research has consistently shown that equidistant placement of plants produces the highest possible yields, quality and uniformity within various types of crops. However, most planter devices do not provide uniform seed placement within the furrow created by an opener. The seeds are placed at unequal distances thereby causing some seeds to be closer to others.

Contributing to this problem is seed movement after release from the planter because of the forward motion of the planter depositing the seed on stationary ground. Because many of the plants are growing closer to one another, their overall growth is stunted because of lack of nutrients, water and sunlight. Hence, there is a need for a planter device tat uniformly places seeds within a furrow for increasing crop yields.

2. Description of the Prior Art

Planter devices have been in use for years. Typically, a planter device includes a storage bin for storage of the seed. Conventional planter devices utilize a singulation system connected to the storage bin, however, a length of tube generally transports the singulated seed to the furrow.

Unfortunately, conventional planter devices do not provide a uniform place of seed within the open furrow. The distance the seed has to travel within the delivery tube is often times greater than 18 inches thereby adding significantly to the inaccuracies between the rows. In addition, the seed often times exits the delivery tube to engage the ground surface at approximately the velocity of the planter device causing a bounce and roll effect. This movement of the seed is undesirable since it contributes to misplacement and uneven placement of the seeds within the open furrow.

Examples of planter devices include U.S. Pat. No. 4,628,841 to Powilleit; U.S. Pat. No. 4,650,093 to Meyer-Bosse; U.S. Pat. No. 4,515,291 to Holmes; U.S. Pat. No. 4,928,607 to Luigi; U.S. Pat. No. 5,058,766 to Deckler; U.S. Pat. No. 5,632,212 to Barry; U.S. Pat. No. 5,351,634 to Patton; U.S. Pat. No. 4,449,642 to Dooley; U.S. Pat. No. 4,029,028 to Griffiths; U.S. Pat. No. 4,008,826 to Caree which are all illustrative of such prior art.

Powilleit (U.S. Pat. No. 4,628,841) discloses a single grain sowing machine. Powilleit teaches a seed container, a feeding wheel connected to the seed container, and a sowing wheel which rolls on the ground and on the circumference of which there are means which engage the seed grains. In the lower zone of the sowing wheel, the seed grains are pressed into the soil and released.

Meyer-Bosse (U.S. Pat. No. 4,650,093) discloses an apparatus for separating and distributing granular goods. Meyer-Bosse teaches a housing, a bucket wheel rotatable within the housing, and an outer receiving side and an inner side of the bucket wheel.

Holmes (U.S. Pat. No. 4,515,291) discloses a seed planter, planter assembly and method of pickup up and discharging single seeds. Holmes teaches a seed transport member having a plurality of depressions provide with ramp surfaces sloping downwardly. Air is fed into the deepest portion of the depression and a single seed is trapped in this portion by the low pressure region which forms between the seed and the walls of the depression.

Luigi (U.S. Pat. No. 4,928,607) discloses an electronically controlled pneumatic seeder. Luigi teaches a plurality of seed distributors controlled by direct current motors that are controlled by an electronic devices as a function of the forward speed of the seeder.

Dooley (U.S. Pat. No. 4,449,642) discloses an improved seed sower unit and an improved seed supply hopper for the head. Dooley teaches a frame having a seed reservoir, an indexing means within the frame, a latch means for securing the hopper in operating position, and a seed drain gate means.

While these devices may be suitable for the particular purpose to which they address, they are not as suitable for accurately placing seeds in a furrow thereby providing increased crop yields. Conventional planter devices do not provide accurate placement of seed within the furrow. In addition, conventional planter devices do not allow intermittent placement of seed between adjacent rows for achieving the optimum crop growth conditions.

In these respects, the equidistant planting system according to the present invention substantially departs from the conventional concepts and designs of the prior art, and in so doing provides an apparatus primarily developed for the purpose of accurately placing seeds in a furrow thereby providing increased crop yields.

SUMMARY OF THE INVENTION

In view of the foregoing disadvantages inherent in the known types of planter devices now present in the prior art, the present invention provides a new equidistant planting system construction wherein the same can be utilized for accurately placing seeds in a furrow thereby providing increased crop yields.

The general purpose of the present invention, which will be described subsequently in greater detail, is to provide a new equidistant planting system that has many of the advantages of the planter devices mentioned heretofore and many novel features that result in a new equidistant planting system which is not anticipated, rendered obvious, suggested, or even implied by any of the prior art planter devices, either alone or in any combination thereof.

To attain this, the present invention generally comprises a rim member having a lower opening, a main disk rotatably positioned within the rim member, a plurality of feeder tubes attached to the main disk, a center disk secured to the main disk having a plurality of receiving channels that correspond with each of the feeder tubes, a plurality of first apertures extending through the center disk and the main disk adjacent each of the receiving channels, and a manifold having an end cutout rotatably positioned about the center disk. The manifold is fluidly connected to a seed tube and an air tube wherein the air tube provides pressurized air to the manifold which escapes through the first apertures creating a vertex within the distal portion of the receiving channels which retains the seeds in the proper position. As the center disk and main disk rotate within the rim member, one of the receiving channels and the corresponding feeder tube is aligned with the end cutout within the manifold forcing the retained seed through the feeder tube to the distal portion of the feeder tube. As the distal end of the feeder tube passes over the lower opening within the rim member, the seed is released at approximately zero velocity with respect to the ground surface thereby reducing seed movement after placement.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object of the present invention is to provide an equidistant planting system that will overcome the shortcomings of the prior art devices.

A further object of the present invention is to provide an equidistant planting system that will overcome the shortcomings of the prior art devices.

Another object is to provide an equidistant planting system that provides uniform and even placement of seed within a furrow.

An additional object is to provide an equidistant planting system that increases crop growth, yield, quality and uniformity.

A further object is to provide an equidistant planting system that accurately places seed with respect to adjacent rows thereby allowing intermittent place of seed between adjacent rows.

Another object is to provide an equidistant planting system that reduces seed movement after being placed within the open furrow.

A further object is to provide an equidistant planting system that reduces the vertical distance a seed has to travel uncontrollably prior to being placed within a furrow.

Another object is to provide an equidistant planting system that delivers the seed into the furrow at approximately zero velocity instead of the velocity of the planter.

A further object is to provide an equidistant planting system that allows a user to achieve a diamond shaped equidistant crop placement pattern for maximizing nutrients, water and sunlight to all crop plants.

An additional object is to provide an equidistant planting system that virtually eliminates the planter speed as a factor in determining seed placement.

Another object is to provide an equidistant planting system that provides rapid control of the ground for shading and thereby controlling weed growth which results in reduced herbicide usage.

A further object is to provide an equidistant planting system that provides increased crop uniformity for providing easier harvesting and drying.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
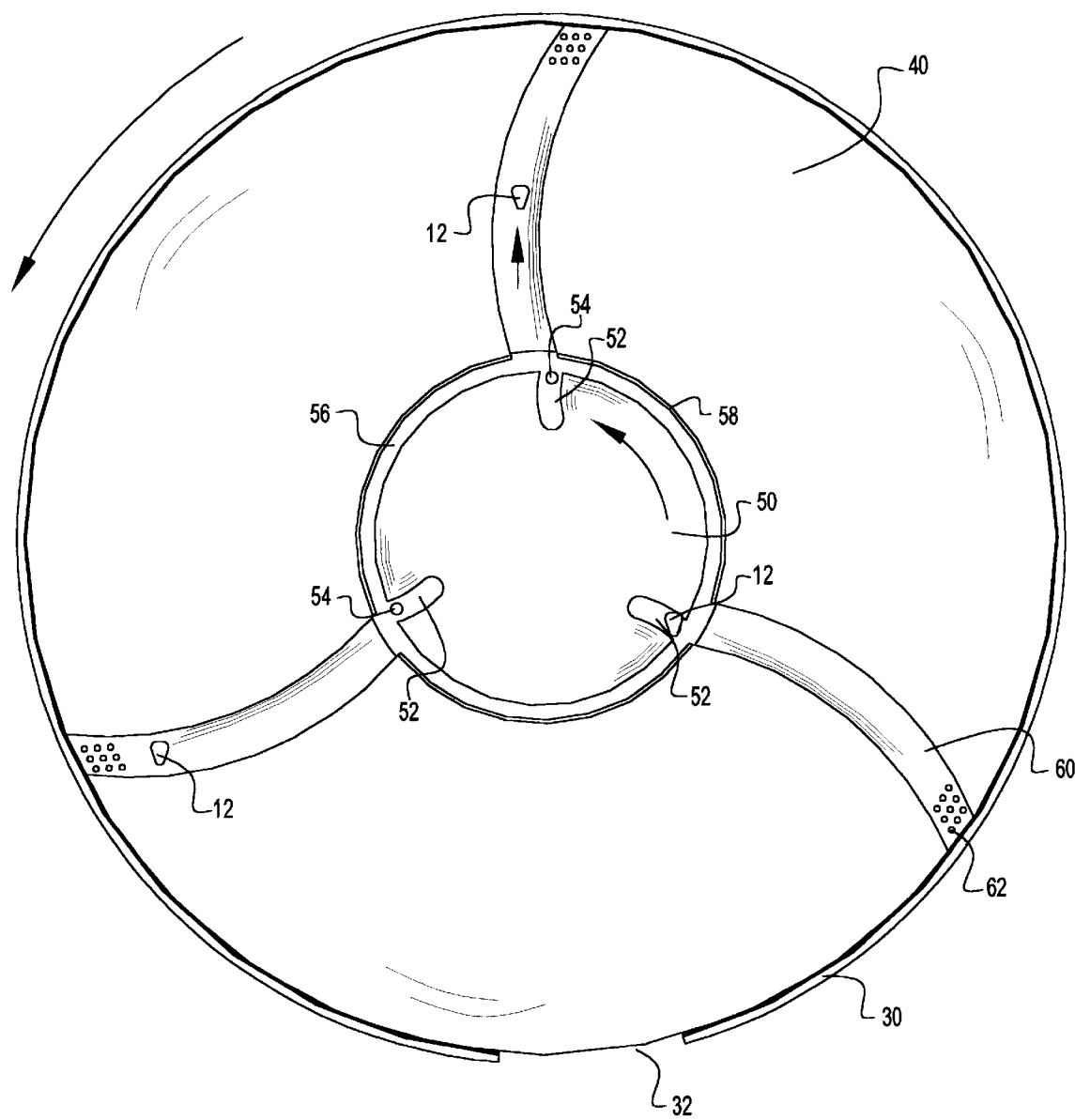
FIG. 1 is a front view of the main disk rotatably positioned within the rim member.

Turning now descriptively to the drawings, in which similar reference characters denote similar elements throughout the several views, FIGS. 1 through 5 illustrate an equidistant planting system 10, which comprises a rim member 30 having a lower opening 32, a main disk 40 rotatably positioned within the rim member 30, a plurality of feeder tubes 60 attached to the main disk 40, a center disk 50 secured to the main disk 40 having a plurality of receiving channels 52 that correspond with each of the feeder tubes 60, a plurality of first apertures 54 extending through the center disk 50 and the main disk 40 adjacent each of the receiving channels 52, and a manifold 20 having an end cutout 26 rotatably positioned about the center disk 50. The manifold 20 is fluidly connected to a seed tube 24 and an air tube 22 wherein the air tube 22 provides pressurized air to the manifold 20 which escapes through the first apertures 54 creating a vertex within the distal portion of the receiving channels 52 which retains the seeds 12 in the proper position. As the center disk 50 and main disk 40 rotate within the rim member 30, one of the receiving channels 52 and the corresponding feeder tube is aligned with the end cutout 26 within the manifold 20 forcing the retained seed through the feeder tube to the distal portion of the feeder tube. As the distal end of the feeder tube passes over the lower opening 32 within the rim member 30, the seed is released at approximately zero velocity with respect to the ground surface thereby reducing seed movement after placement.

As can be appreciated by one skilled in the art, a conventional opener is attached to the planter frame for creating an open furrow in front of the rim member 30. The opener may be comprised of any well-known opener such as disk openers or shoe openers.

Figure 2:
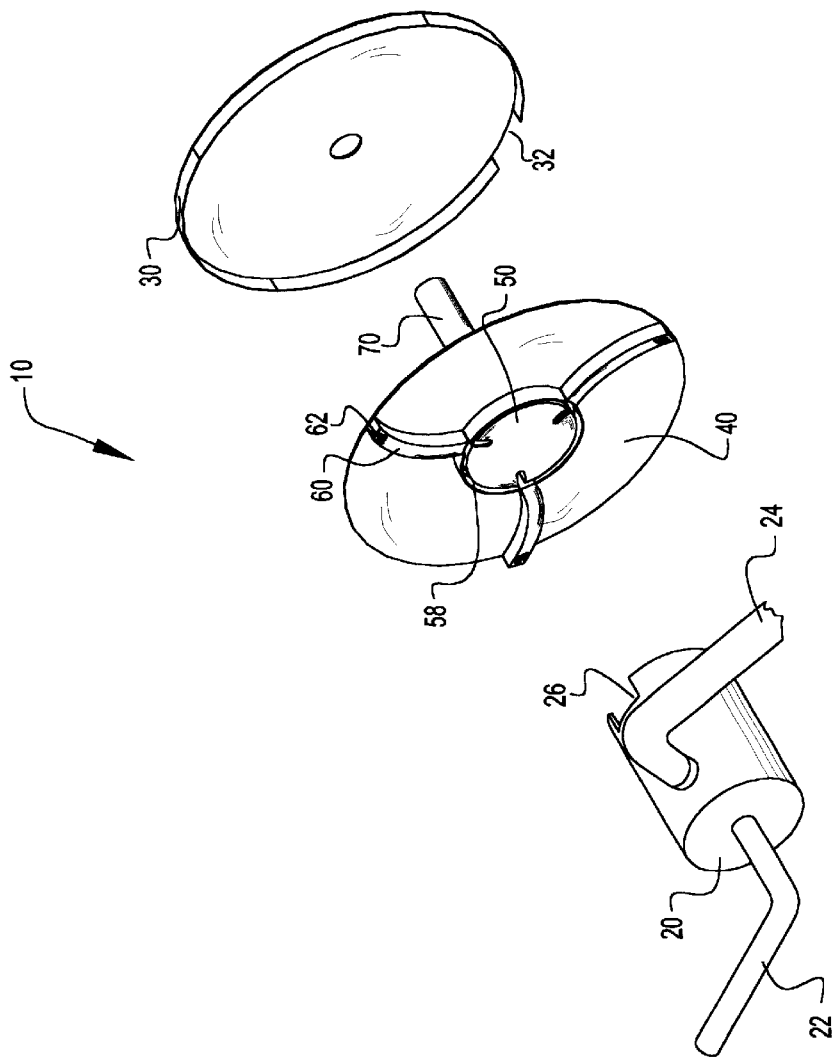
FIG. 2 is a front upper exploded perspective view of the present invention.

As shown in FIGS. 1 through 5 of the drawings, a rim member 30 is provided having a generally circular interior shape. At least one rim member 30 is securable to a planter frame depending upon the total number of crop rows desired to be simultaneously planted. For the sake of brevity, further discussion will be solely upon one individual unit of the present invention though it can be appreciated by one skilled in the art that more than one row will be planted at one time thereby requiring multiple units of the present invention. As shown in FIG. 2 of the drawings, the rim member 30 includes a center opening for receiving a drive shaft 70 secured to the main disk 40 which rotates the main disk 40 within the rim member 30. The drive shaft 70 is mechanically connected to a rotating structure that corresponds the rotational velocity with respect to the horizontal velocity of the planting unit with respect to the ground surface to ensure that the seed 12 is dispersed from within the feeder tubes 60 at a horizontal velocity of approximately zero with respect to the ground surface.

Figure 5:
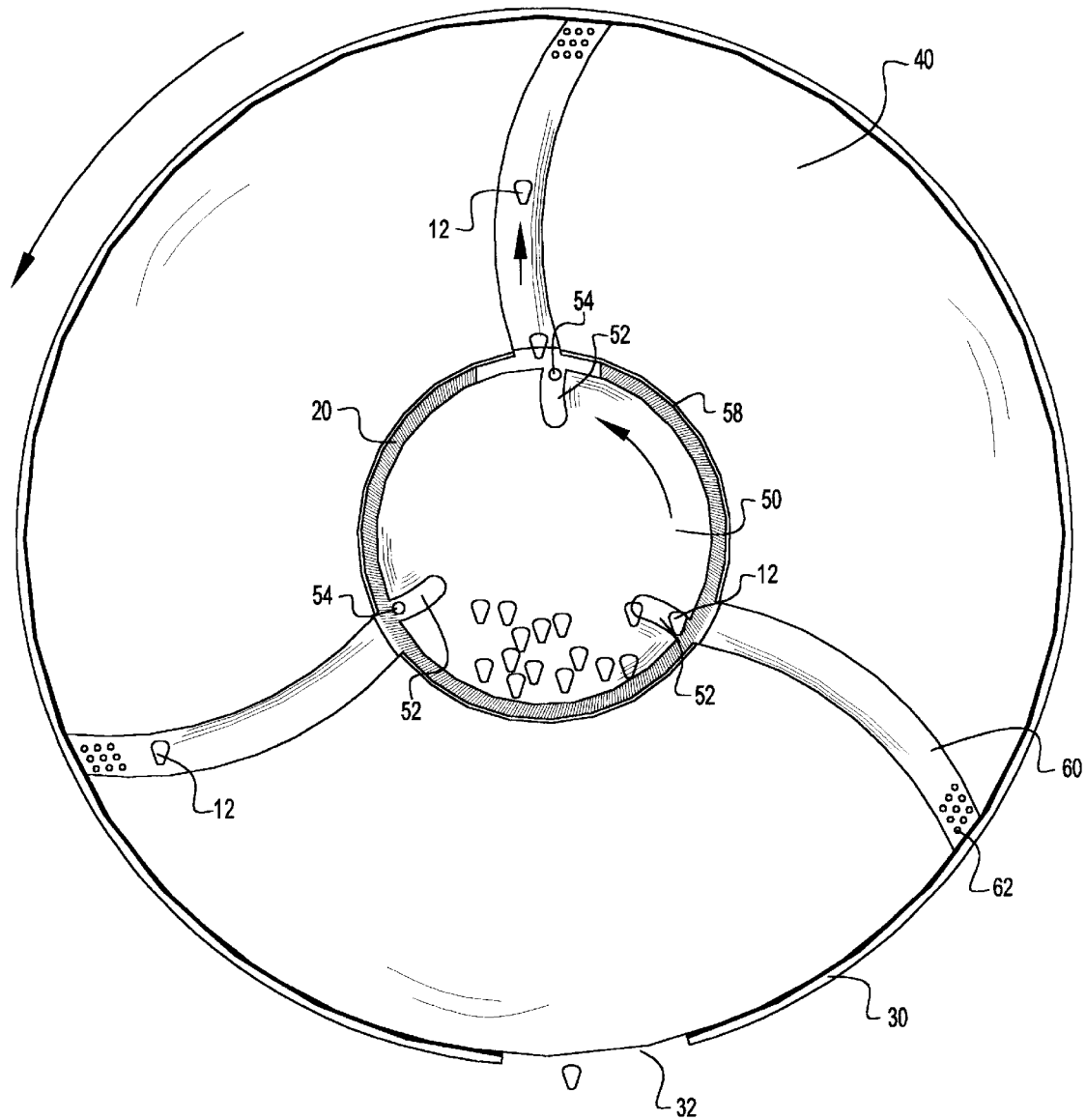
FIG. 5 is a cross sectional view taken along line 5—5 of FIG. 4.

As shown in FIGS. 1, 2 and 5 of the drawings, the rim member 30 includes a lower opening 32 for allowing dispersing of the seed at a velocity of approximately zero in relation to a ground surface. The lower opening 32 is formed for allowing a substantially horizontal exiting of the seed during planting as shown in FIG. 5 of the drawings.

As shown in FIGS. 1, 2, 4 and 5 of the drawings, a main disk 40 is provided that is rotatably positioned within the rim member 30. As further shown in the figures, a center disk 50 is centrally secured to the main disk 40 having a plurality of receiving channels 52 for receiving seeds 12. The receiving channels 52 extend outwardly from the outer perimeter of the center disk 50 as best shown in FIG. 1 of the drawings.

As further shown in FIG. 1 of the drawings, a plurality of first apertures 54 extend through the center disk 50 and the main disk 40 adjacent an outer portion of the receiving channels 52 for creating a vertex within the receiving channels 52 for retaining the seeds 12. The plurality of first apertures 54 allow a single seed 12 to be captured within the distal portion of the receiving channels 52 during the rotation of the main disk 40 and the center disk 50. A ring channel 56 is defined between the outer perimeter of the center disk 50 and an outer hub 58 secured to the main disk 40 about the center disk 50.

Figure 3:
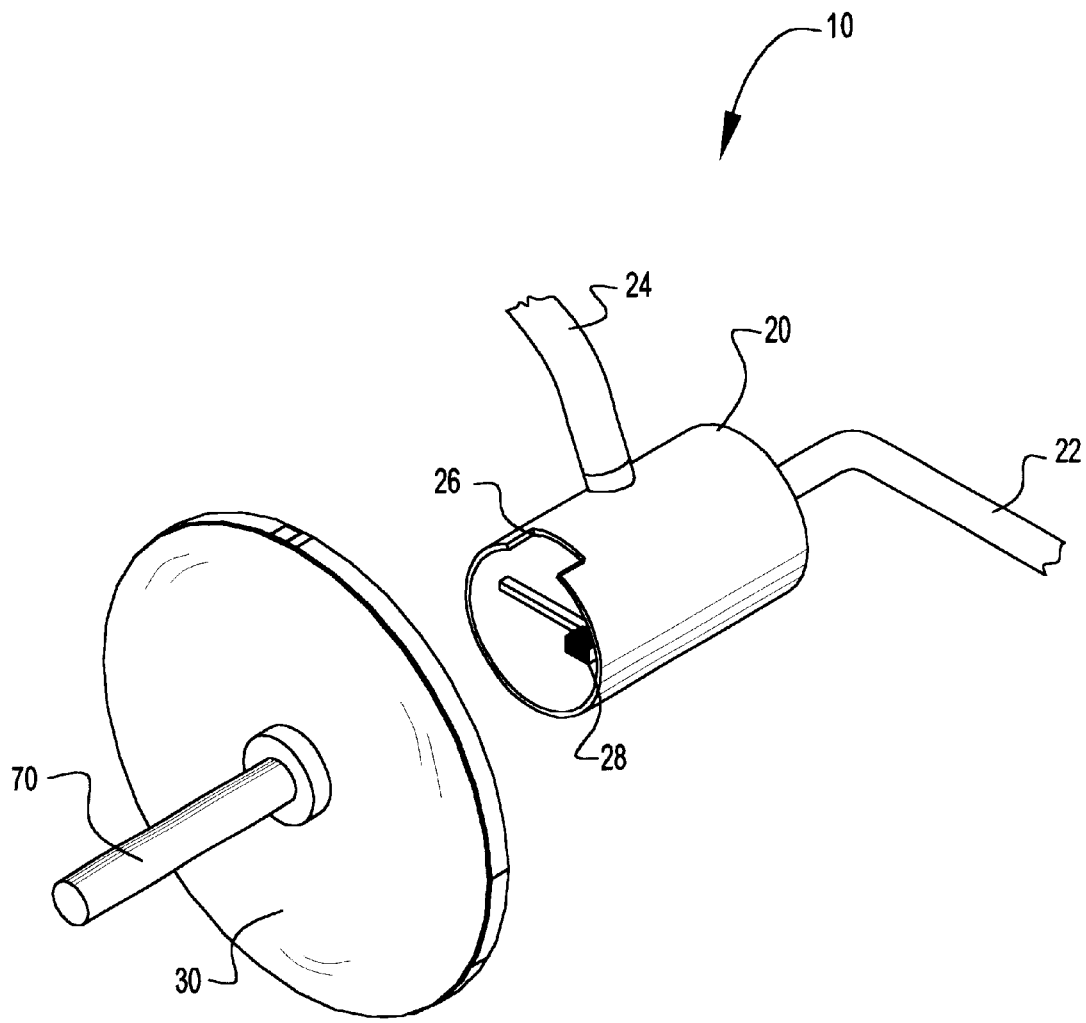
FIG. 3 is a rear upper exploded perspective view of the present invention.
Figure 4:
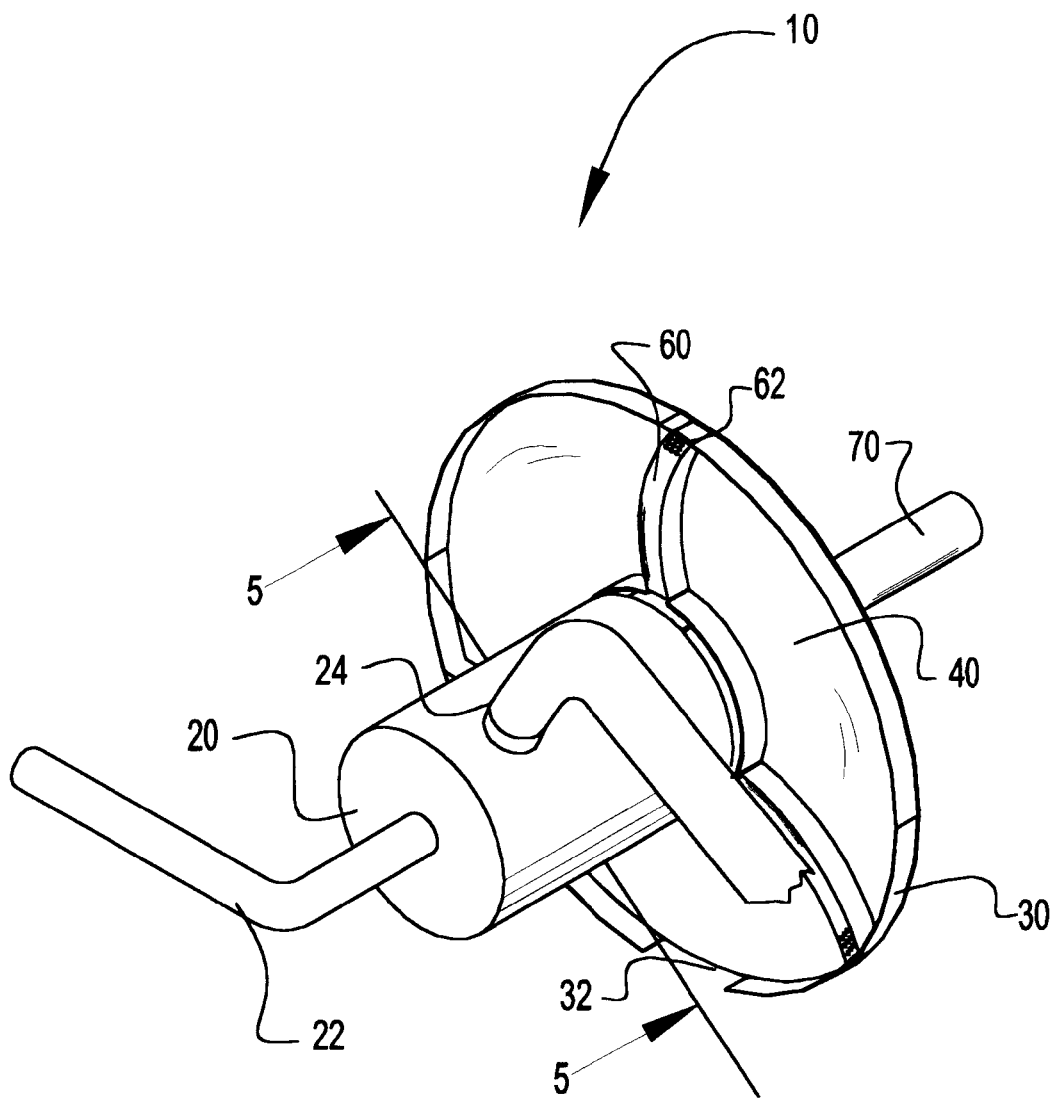
FIG. 4 is a front upper perspective view of the present invention.

As shown in FIG. 4 of the drawings, a manifold 20 rotatably positioned about the center disk 50 having an end cutout 26, wherein air within the manifold 20 is pressurized and the manifold 20 stores a finite amount of seeds 12. The distal portion of the manifold 20 is rotatably received within the ring channel 56 as shown in FIG. 5 of the drawings. The distal portion of the manifold 20 includes an end cutout 26 for allowing the release of the seeds 12 from the receiving channels 52 into the feeder tubes 60 as best shown in FIGS. 2 and 3 of the drawings. As shown in FIG. 3, a brush 28 is secured within the manifold 20 for engaging an outer surface of the center disk 50 thereby allowing the center disk 50 to disperse only a single seed into each of the plurality of feeder tubes 60 per revolution of the main disk 40.

As shown in FIGS. 1, 2, 4 and 5 of the drawings, a plurality of feeder tubes 60 are secured to the main disk 40 with each having an inner end adjacent the receiving channels 52 within the center disk 50 and each extending from a central portion of the main disk 40 to an outer portion of the main disk 40. The inner end of the feeder tubes 60 receives the seeds 12 from the receiving channels 52 as shown in FIGS. 1 and 5 of the drawings. A distal end of each of the plurality of feeder tubes 60 includes a plurality of second apertures 62 for allowing the release of the pressurized air from the manifold 20. As shown in FIGS. 1 and 5 of the drawings, the plurality of feeder tubes 60 are preferably curved away from a rotational movement of the main disk 40 however it can be appreciated that various other shapes and designs may be utilized.

The main disk 40 has a rotational velocity that directly corresponds to a forward movement of the rim member 30 with respect to a ground surface thereby dispersing the singulated seeds 12 from within the feeder tubes 60 at approximately zero horizontal velocity with respect to a ground surface as shown in FIG. 5 of the drawings.

In use, the seed manifold 20 receives seed 12 from a hopper or other device through a seed tube 24. Pressurized air is provided to the manifold 20 through an air tube 22 as shown in FIGS. 2 through 4 of the drawings. The pressurized air travels from within the manifold 20 through the first apertures 54 within the receiving channels 52 thereby creating a vertex within the receiving channels 52 for receiving and capturing the seeds 12. As the main disk 40 and center disk 50 rotate within the rim member 30 and the manifold 20, one of the receiving channels 52 containing a seed is aligned with the end cutout 26 of the manifold thereby allowing the air within the manifold to travel through the respective feeder tube 60 aligned with the receiving channel 52. The seed 12 is thereby forced through the feeder tube toward the distal portion of the feeder tube 60 wherein the main disk continues to rotate within the rim member. The rim member prevents the seed 12 from being released from within the feeder tube 60 until the feeder tube 60 is aligned above the lower opening within the rim member. As the feeder tube 60 is aligned with the lower opening, the seed 12 is allowed to escape through the opening 32 at a horizontal velocity approximately opposite to the velocity of the planter thereby creating an effective zero velocity for the seed 12 except for the slight vertical velocity that is achieved by traveling from the opening 32 to the lower surface of the furrow. The first seed 12 then engages the bottom of the furrow without rolling or bouncing thereby ensuring proper placement of the first seed 12 within the furrow. Because of the increased accuracy, the adjacent rows being planted by the planter may be staggered so that the seeds of the adjacent row are between the seeds of the adjacent row thereby maximizing crop yields.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

| Index of Elements for Equidistant Planting System ENVIRONMENTAL ELEMENTS |
| --- |
| 10. Equidistant Planting System |
| 11. |
| 12. Seed |
| 13. |
| 14. |
| 15. |
| 16. |
| 17. |
| 18. |
| 19. |
| 20. Manifold |
| 21. |
| 22. Air Tube |
| 23. |
| 24. Seed Tube |
| 25. |
| 26. End Cutout |
| 27. |
| 28. Brush |
| 29. |
| 30. Rim Member |
| 31. |
| 32. Lower Opening |
| 33. |
| 34. |
| 35. |
| 36. |
| 37. |
| 38. |
| 39. |
| 40. Main Disk |
| 41. |
| 42. |
| 43. |
| 44. |
| 45. |
| 46. |
| 47. |
| 48. |
| 49. |
| 50. Center Disk |
| 51. |
| 52. Receiving Channels |
| 53. |
| 54. First Apertures |
| 55. |
| 56. Ring Channel |
| 57. |
| 58. Outer Hub |
| 59. |
| 60. Feeder Tubes |
| 61. |
| 62. Second Apertures |
| 63. |
| 64. |
| 65. |
| 66. |
| 67. |
| 68. |
| 69. |
| 70. Drive Shaft |
| 71. |
| 72. |
| 73. |
| 74. |
| 75. |
| 76. |
| 77. |
| 78. |
| 79. |

I claim:

1. An equidistant planting system, comprising:

a rim member securable to a planter frame, wherein said rim member includes a lower opening;

a seed manifold structure for dispersing singulated seeds;

a main disk rotatably positioned within said rim member and about said seed manifold; and at least one feeder tube secured to said main disk having an inner end and extending from a central portion of said main disk to an outer portion of said main disk, wherein said inner end receives said singulated seeds from said seed manifold structure.

2. The equidistant planting system of claim 1, wherein a distal end of said at least one feeder tube includes a plurality of apertures.

3. The equidistant planting system of claim 1, wherein a distal portion of said at least one feeder tube is curved away from a rotational movement of said main disk.

4. The equidistant planting system of claim 1, wherein said at least one feeder tube is curved away from a rotational movement of said main disk.

5. The equidistant planting system of claim 1, wherein said main disk has a rotational velocity that directly corresponds to a forward movement of said rim member with respect to a ground surface thereby dispersing said singulated seeds from within said at least one feeder tube at approximately zero horizontal velocity with respect to a ground surface.

6. The equidistant planting system of claim 1, wherein said lower opening is broad enough to allow a substantially horizontal exiting of said singulated seeds from within said at least one feeder tube.

7. The equidistant planting system of claim 1, wherein said seed manifold structure disperses only a single seed into each of said at least one feeder tube per revolution of said main disk.

8. The equidistant planting system of claim 1, wherein said at least one feeder tube receives pressurized air near said inner end thereby forcing said singulated seeds towards a distal end of said at least one feeder tube.

9. The equidistant planting system of claim 8, wherein said distal end of said at least one feeder tube includes a plurality of apertures for allowing the release of said pressurized air within prior to said distal end of said at least one feeder tube passing over said lower opening of said rim member.

10. The equidistant planting system of claim 1, wherein said rim member includes a center opening for receiving a drive shaft secured to said main disk which rotates said main disk within said rim member.

11. An equidistant planting system, comprising:

a rim member securable to a planter frame, wherein said rim member includes a lower opening;

a main disk rotatably positioned within said rim member;

a center disk centrally secured to said main disk having at least one receiving channel for receiving seeds;

a manifold rotatably positioned about said center disk having an end cutout, wherein air within said manifold is pressurized and said manifold stores a finite amount of seeds;

at least one first aperture extending through said center disk and said main disk adjacent an outer portion of said receiving channels for creating a vertex within said receiving channel for retaining said seeds; and at least one feeder tube secured to said main disk having an inner end adjacent said receiving channels and extending from a central portion of said main disk to an outer portion of said main disk, wherein said inner end receives said seeds from said receiving channel.

12. The equidistant planting system of claim 11, wherein a distal end of said at least one feeder tube includes a plurality of apertures.

13. The equidistant planting system of claim 11, wherein a distal portion of said at least one feeder tube is curved away from a rotational movement of said main disk.

14. The equidistant planting system of claim 11, wherein said at least one feeder tube is curved away from a rotational movement of said main disk.

15. The equidistant planting system of claim 11, wherein said main disk has a rotational velocity that directly corresponds to a forward movement of said rim member with respect to a ground surface thereby dispersing said singulated seeds from within said at least one feeder tube at approximately zero horizontal velocity with respect to a ground surface.

16. The equidistant planting system of claim 11, wherein said lower opening is broad enough to allow a substantially horizontal exiting of said singulated seeds from within said plurality of feeder tubes.

17. The equidistant planting system of claim 11, including a brush secured within said manifold for engaging an outer surface of said center disk thereby allowing said center disk to disperse only a single seed into said at least one feeder tube per revolution of said main disk.

18. The equidistant planting system of claim 11, wherein said rim member includes a center opening for receiving a drive shaft secured to said main disk which rotates said main disk within said rim member.

19. The equidistant planting system of claim 18, wherein said at least one feeder tube is curved away from a rotational movement of said main disk.

20. An equidistant planting system, comprising:

a rim member securable to a planter frame, wherein said rim member includes a lower opening;

a main disk rotatably positioned within said rim member;

a center disk centrally secured to said main disk having a plurality of receiving channels for receiving seeds;

a manifold rotatably positioned about said center disk having an end cutout, wherein air within said manifold is pressurized and said manifold stores a finite amount of seeds;

a plurality of first apertures extending through said center disk and said main disk adjacent an outer portion of said receiving channels for creating a vertex within said receiving channels for retaining said seeds;

a plurality of feeder tubes secured to said main disk each having an inner end adjacent said receiving channels and each extending from a central portion of said main disk to an outer portion of said main disk, wherein said inner end receives said seeds from said receiving channels;

wherein a distal end of each of said plurality of feeder tubes includes a plurality of apertures;

wherein said plurality of feeder tubes are curved away from a rotational movement of said main disk;

wherein said main disk has a rotational velocity that directly corresponds to a forward movement of said rim member with respect to a ground surface thereby dispersing said singulated seeds from within said feeder tubes at approximately zero horizontal velocity with respect to a ground surface;

wherein said lower opening is broad enough to allow a substantially horizontal exiting of said singulated seeds from within said plurality of feeder tubes;

a brush secured within said manifold for engaging an outer surface of said center disk thereby allowing said center disk to disperse only a single seed into each of said plurality of feeder tubes per revolution of said main disk; and wherein said rim member includes a center opening for receiving a drive shaft secured to said main disk which rotates said main disk within said rim member.

* * * * *